(12) United States Patent
Romero

(10) Patent No.: US 6,896,458 B1
(45) Date of Patent: May 24, 2005

(54) TIE-DOWN ASSEMBLY ACCESSORY

(76) Inventor: A. J. Romero, 4306 Bares Rd., Abbeville, LA (US) 70510

( * ) Notice: Subject to any disclaimer, the term of this patent is extended or adjusted under 35 U.S.C. 154(b) by 0 days.

(21) Appl. No.: 10/133,932

(22) Filed: Apr. 25, 2002

(51) Int. Cl.$^7$ ................................................. B60P 7/08
(52) U.S. Cl. ........................................ 410/97; 410/100
(58) Field of Search ........................... 410/96, 97, 100; 24/68 CD, 302, 306, 265 CD, 442; 248/499

(56) References Cited

U.S. PATENT DOCUMENTS

| | | | | |
|---|---|---|---|---|
| 3,994,048 A | * | 11/1976 | Rosenthal | |
| 4,759,963 A | * | 7/1988 | Uso, Jr. et al. | |
| 5,174,483 A | * | 12/1992 | Moore, IV et al. | |
| 5,423,644 A | * | 6/1995 | First, Sr. ..................... | 410/100 |
| 5,603,591 A | * | 2/1997 | McLellan ..................... | 410/97 |
| 6,049,953 A | * | 4/2000 | McCay et al. | |
| 6,099,221 A | * | 8/2000 | Takagi ......................... | 410/97 |
| 6,318,612 B1 | * | 11/2001 | MacNeil | |
| 6,394,720 B1 | * | 5/2002 | McCay ........................ | 410/100 |
| 6,422,794 B1 | * | 7/2002 | Zhan et al. .................. | 410/100 |
| 6,449,815 B1 | * | 9/2002 | Spiller | |
| 6,524,041 B1 | * | 2/2003 | Voiculescu ................... | 410/100 |

* cited by examiner

Primary Examiner—Stephen T. Gordon
(74) Attorney, Agent, or Firm—Roy, Kiesel, Keegan & DeNicola

(57) ABSTRACT

A tie-down assembly accessory that includes a main strap section and first and second securing/slide loop straps. The first and second securing/slide loop straps are configurable by the user to form a slide loop for slidably receiving the securing strap of a tie-down assembly and a securing loop for securing the securing straps during storage or the end of a securing strap pulled past the take up assembly during installation of the tie-down assembly.

2 Claims, 5 Drawing Sheets

TIE-DOWN ASSEMBLY ACCESSORY

TECHNICAL FIELD

The present invention relates to accessories for tie-down assemblies and more particularly to a tie-down assembly accessory that is slidably securable to a tether member of a tie-down assembly and that includes adjustable length securing loops for securing the tether member of the tie-down assembly for storage and securing an excess portion of the tether member of the tie-down assembly when the tie-down assembly is in use; the tie-down assembly accessory including a main strap section and first and second securing/slide loop forming strap sections that each include an attachment end attached to the main strap section at separate attachment locations of the main strap section and extend from opposite side edges of the main strap section and terminating at a securable end; the first securing/slide loop forming strap section being of a first loop forming strap section length and having a first loop strap loop interior facing side and a first loop strap loop exterior facing side; the second securing/slide loop forming strap section being of a second loop forming strap section length and having a second loop strap loop interior facing side and a second loop strap loop exterior facing side; the main strap section being of a main strap section width and having a main strap loop interior facing side and a main strap loop exterior facing side; the main strap section further having first and second slide loop forming sections of hook and pile fastener material secured to the main strap loop exterior facing side thereof at the locations of attachment of, respectively, the first and second securing/slide loop forming strap sections to the main strap section; the first securing/slide loop forming strap section having a first companionate slide loop forming section of hook and pile fastener material secured to the first loop strap loop interior facing side thereof such that the first companionate slide loop forming section of hook and pile fastener material is engageable with the first slide loop forming section of hook and pile fastener material in a manner to form a first slide loop having a first slide loop opening at least partially defined by the first loop strap loop interior facing side of the first securing/slide loop forming strap section; the second securing/slide loop forming strap section having a first companionate slide loop forming section of hook and pile fastener material secured thereon to the second loop strap loop interior facing side thereof such that the first companionate slide loop forming section of hook and pile fastener material is engageable with the second slide loop forming section of hook and pile fastener material in a manner to form a first slide loop having a first slide loop opening at least partially defined by the second loop strap loop interior facing side of the second securing/slide loop forming strap section; the first securing/slide loop strap having a first securing loop strap securing loop forming section of hook and pile fastening material attached to the first loop strap loop exterior facing side thereof and extending from the securable end thereof and a second securing loop strap securing loop forming companionate section of hook and pile fastening material attached to the first loop strap loop interior facing side thereof that is engageable with first securing loop strap securing loop forming section of hook and pile fastening material to form a first securing loop in a manner such that the securable end of the first securing/slide loop strap is secured; the second securing/slide loop strap having a first securing loop strap securing loop forming section of hook and pile fastening material attached to the second loop strap loop exterior facing side thereof and extending from the securable end thereof and a second securing loop strap securing loop forming companionate section of hook and pile fastening material attached to the second loop strap loop interior facing side thereof that is engageable with first securing loop strap securing loop forming section of hook and pile fastening material to form a first securing loop in a manner such that the securable end of the second securing/slide loop strap is secured.

BACKGROUND ART

Many tie-down assemblies use a ratchet buckle assembly that has a first securing strap fixedly secured to one end and a second securing strap engaged with a ratchet-type take up assembly that engages a section of the second securing strap and pulls the section through and past the take up assembly to shorten the effective length of the second securing strap. These work well but the securing straps can become tangled during storage and the section of the second securing strap positioned past the take up assembly is free to flap in the wind causing damage to that section and the structures it strikes while flapping about. It would be desirable, therefore, to have a tie-down assembly accessory that could be used to maintain the securing straps in a coiled configuration during storage and also to secure the section of securing strap that is pulled past the take up assembly when the tie-down assembly is tightened during installation.

General Summary Discussion of Invention

It is thus an object of the invention to provide a tie-down assembly accessory that may be used to maintain the securing straps of a tie-down assembly in a coiled configuration during storage and also to secure the section of securing strap that is pulled past the take up assembly of the tie-down assembly when the tie-down assembly is tightened during installation.

Accordingly, a tie-down assembly accessory is provided. The tie-down assembly accessory includes a main strap section and first and second securing/slide loop forming strap sections that each include an attachment end attached to the main strap section at separate attachment locations of the main strap section and extend from opposite side edges of the main strap section and terminating at a securable end; the first securing/slide loop forming strap section being of a first loop forming strap section length and having a first loop strap loop interior facing side and a first loop strap loop exterior facing side; the second securing/slide loop forming strap section being of a second loop forming strap section length and having a second loop strap loop interior facing side and a second loop strap loop exterior facing side; the main strap section being of a main strap section width and having a main strap loop interior facing side and a main strap loop exterior facing side; the main strap section further having first and second slide loop forming sections of hook and pile fastener material secured to the main strap loop exterior facing side thereof at the locations of attachment of, respectively, the first and second securing/slide loop forming strap sections to the main strap section; the first securing/slide loop forming strap section having a first companionate slide loop forming section of hook and pile fastener material secured to the first loop strap loop interior facing side thereof such that the first companionate slide loop forming section of hook and pile fastener material is engageable with the first slide loop forming section of hook and pile fastener material in a manner to form a first slide loop having a first slide loop opening at least partially defined by the first loop strap loop interior facing side of the first securing/slide loop forming strap section; the second securing/slide loop forming strap section having a first companionate slide loop forming section of hook and pile fastener material secured thereon to the second loop strap loop interior facing side thereof such that the first companionate slide loop forming section of hook and pile fastener material is engageable with the second slide loop forming section of hook and pile fastener material in a manner to form a first slide loop having a first slide loop opening at least partially defined by the second loop strap loop interior facing side of the first securing/slide loop forming strap section; the first securing/slide loop strap having a first securing loop strap securing loop forming section of hook and pile fastening material attached to the first loop strap loop exterior facing side thereof and extending from the securable end thereof and a second securing loop strap securing loop forming companionate section of hook and pile fastening material attached to the first loop strap loop interior facing side thereof that is engageable with first securing loop strap securing loop forming section of hook and pile fastening material to form a first securing loop in a manner such that the securable end of the first securing/slide loop strap is secured; the second securing/slide loop strap having a first securing loop strap securing loop forming section of hook and pile fastening material attached to the second loop strap loop exterior facing side thereof and extending from the securable end thereof and a second securing loop strap securing loop forming companionate section of hook and pile fastening material attached to the second loop strap loop interior facing side thereof that is engageable with first securing loop strap securing loop forming section of hook and pile fastening material to form a first securing loop in a manner such that the securable end of the second securing/slide loop strap is secured.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figures 1, 2:
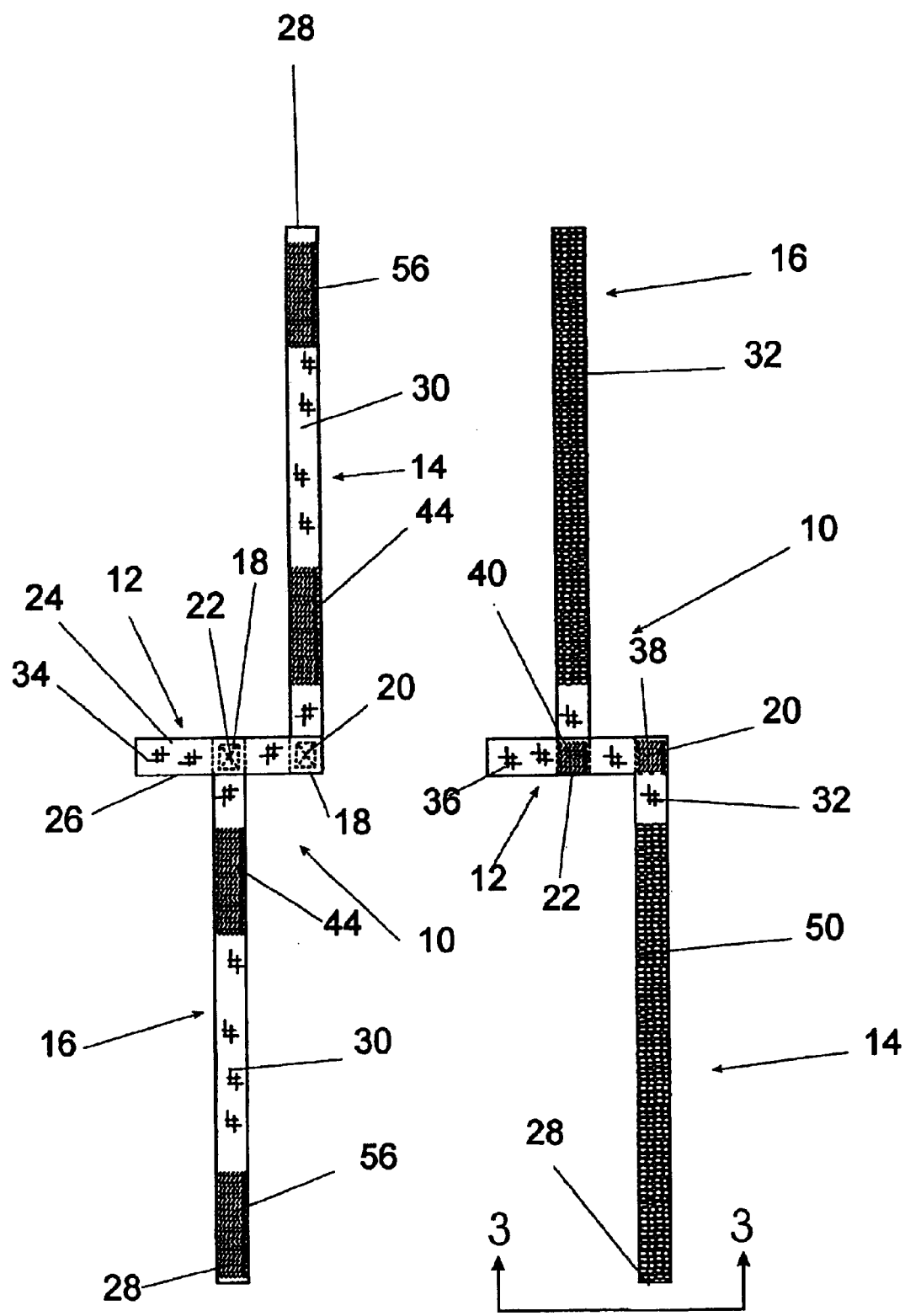
FIG. 1 is a plan view of a loop interior facing side of an exemplary embodiment of the tie-down assembly accessory of the present invention.
FIG. 2 is a plan view of the loop exterior facing side of the tie-down assembly accessory of FIG. 1.
Figure 3:
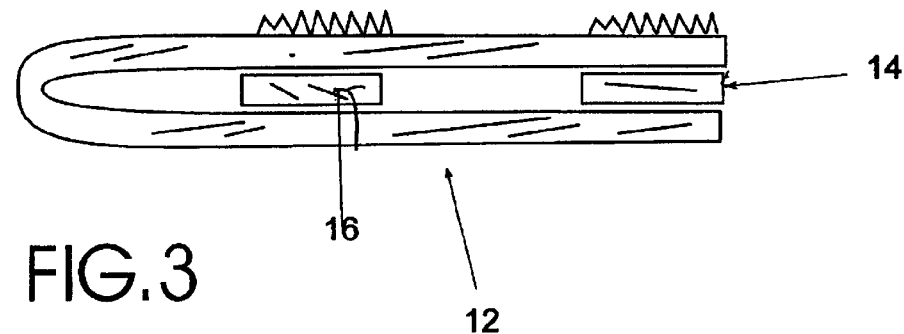
FIG. 3 is a side plan view of the tie-down assembly accessory of FIG. 1 along the line 3—3 of FIG. 2.
Figure 4:
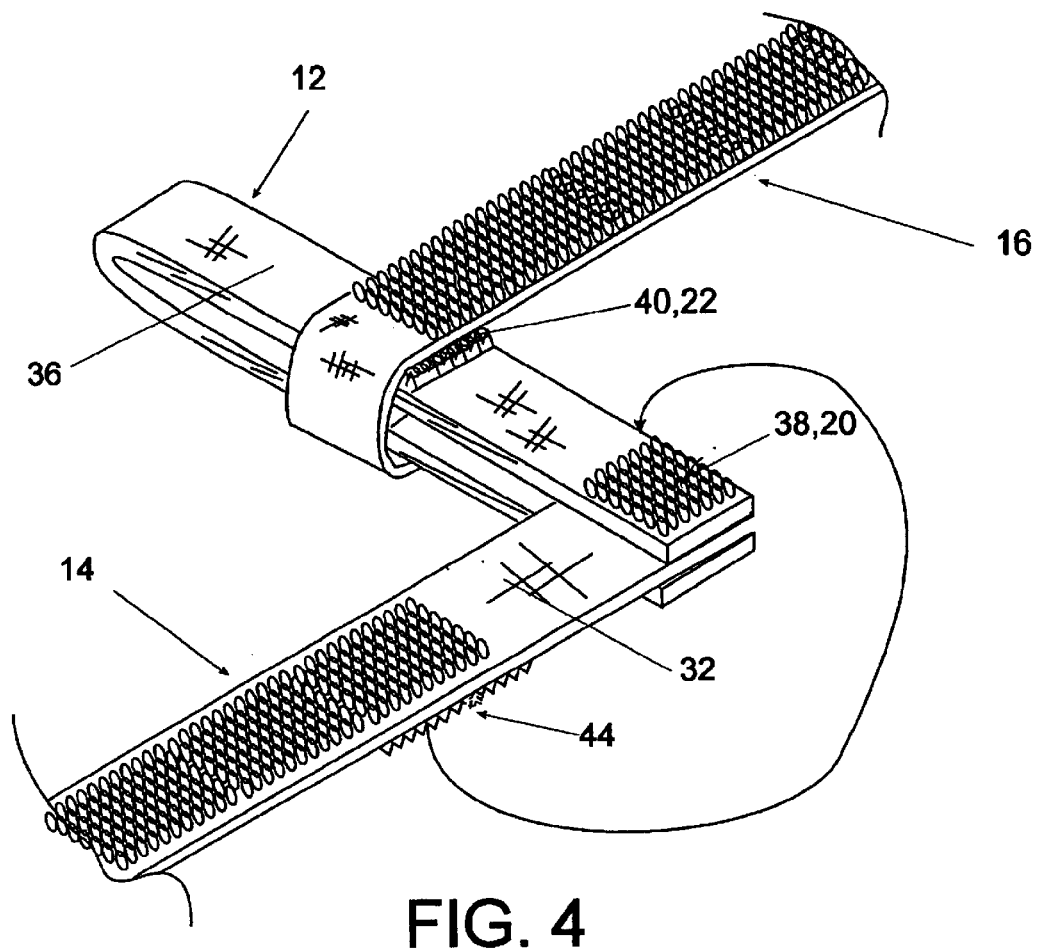
FIG. 4 is a partial perspective view of the tie-down assembly accessory of FIG. 1.
Figure 5:
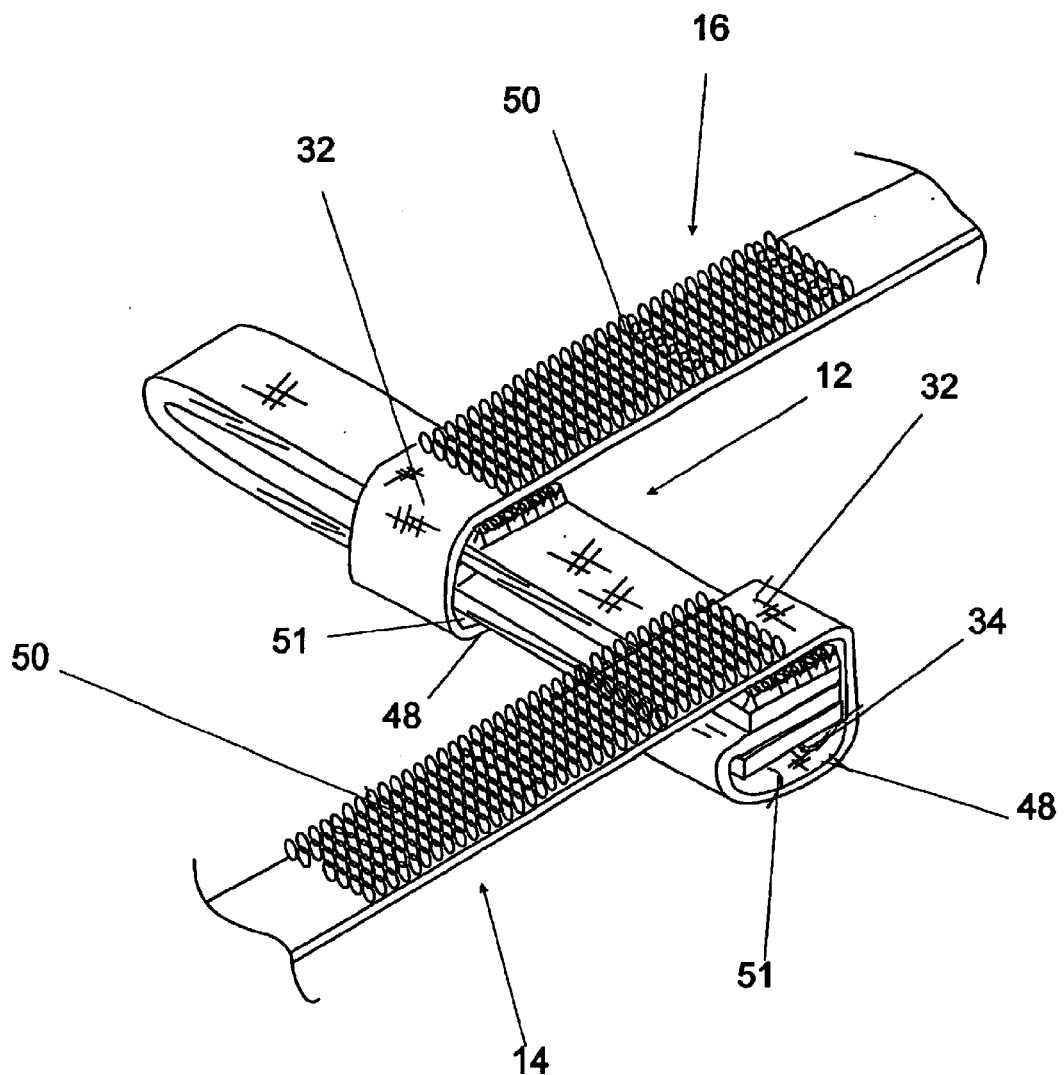
FIG. 5 is another partial perspective view of the tie-down assembly accessory of FIG. 1.
Figure 6:
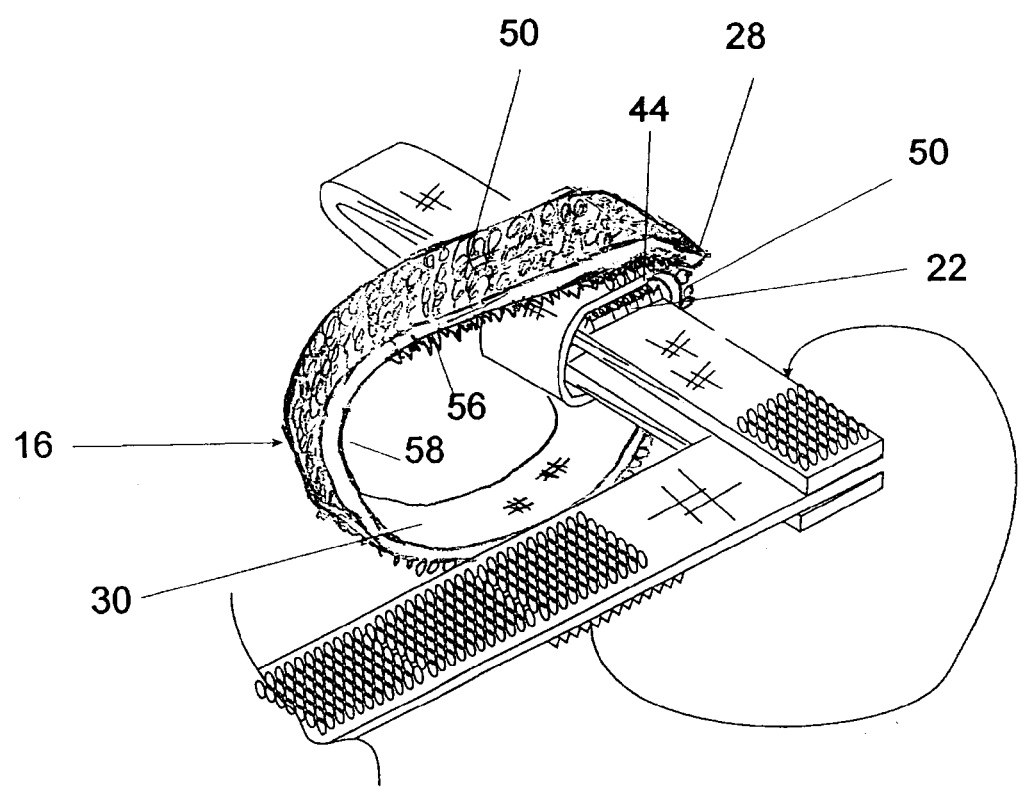
FIG. 6 is another partial perspective view of the tie-down assembly accessory of FIG. 1.
Figure 7:
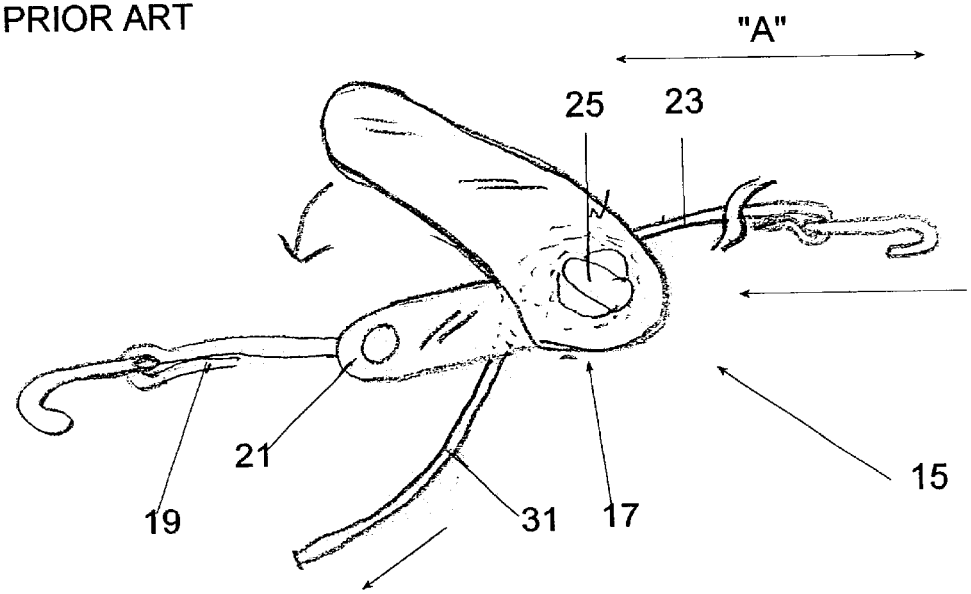
FIG. 7 is side plan view of a representative tie-down assembly.

FIGS. 1–7 show various aspects of an exemplary embodiment of the tie-down assembly accessory of the present invention generally designated 10. Tie-down assembly accessory 10 includes a main strap section, generally designated 12, and first and second securing/slide loop forming strap sections, generally designated 14,16, respectively. Tie-down accessory 10 is adapted to be used with a tie-down assembly such as the representative tie-down assembly, generally designated 15. Tie-down assembly 15 includes a ratchet buckle assembly, generally designated 17, that has a first securing strap 19 fixedly secured to one end 21 and a second securing strap 23 engaged with a ratchet-type take up assembly 25 that engages a section 31 of the second securing strap 23 and pulls the section 31 through and past the take up assembly 25 to shorten the effective length "A" of second securing strap 23. Tie-down assembly accessory 10 is used to maintain the securing straps 19,23 in a coiled configuration during storage and also to secure the section 31 of securing strap 23, that is pulled past the take up assembly 25 when tie-down assembly 15 is tightened during installation.

First and second securing/slide loop forming strap sections 14,16, each include an attachment end 18 that is attached to the main strap section 12 at a separate attachment location 20,22 of main strap section 12 and extend from opposite side edges 24,26 of main strap section 12 terminating at a securable end 28.

The first and second securing/slide loop forming strap sections 14,16 are of identical construction and all of the following discussions of the first and second securing/slide loop forming strap sections 14,16 are equally relevant to and intended to be descriptive of the second 14,16. First securing/slide loop forming strap section 14 is sixteen inches in length and has a first loop strap loop interior facing side 30 and a first loop strap loop exterior facing side 32.

Main strap section 12 is formed of one inch wide nylon webbing material and has a main strap loop interior facing side 34 and a main strap loop exterior facing side 36. Main strap section 12 also has first and second slide loop forming sections 38,40 of hook and pile fastener material secured to the main strap loop exterior facing side 36 thereof at the locations of attachment 20,22 of, respectively, first and second securing/slide loop forming strap sections 14,16 to main strap section 12. First securing/slide loop forming strap section 14 has a first companionate slide loop forming section 44 of hook and pile fastener material secured to the first loop strap loop interior facing side 30 thereof such that the first companionate slide loop forming section of hook and pile fastener material 44 is engageable with first slide loop forming section of hook and pile fastener material 38 in a manner to form a first slide loop 48 having a first slide loop opening 51 partially defined by main strap loop interior facing side 34 of main strap section 12 and partially defined by the first loop strap loop interior facing side 30 of the first securing/slide loop forming strap section 14.

Second securing/slide loop strap 16 has a first securing loop strap securing loop forming section 50 of hook and pile fastening material attached to the loop exterior facing side 32 thereof and extending from the securable end 28 thereof. A second securing loop strap securing loop forming companionate section 56 of hook and pile fastening material is attached to the strap loop interior facing side 30 thereof and is engageable with first securing loop strap securing loop forming section 50 of hook and pile fastening material for forming first securing loop 58 in a manner such that the securable end 28 of the second securing/slide loop strap 16 is secured.

It can be seen from the preceding description that a tie-down assembly accessory has been provided.

It is noted that the embodiment of the tie-down assembly accessory described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tie-down assembly accessory comprising:
   a. a main strap section having first and second attachment locations and having a main strap interior facing side and a main strap exterior facing side, further comprising hook and pile fastener material secured to said main strap loop exterior facing side thereof;
   b. a first securing/slide loop forming strap section having first and second opposite ends and having an interior facing side and an exterior facing side wherein said first opposite end is operatively attached to the main strap section at said first attachment location in a substantially perpendicular configuration, further comprising hook and pile fastener material secured to said exterior facing side and companionate hook and pile fastener material secured to said interior facing side; and
   c. a second securing/slide loop forming strap section having first and second opposite ends and having an interior facing side and an exterior facing side wherein said first opposite end of said second loop forming strap is operatively attached to the main strap section at said second attachment location in a substantially perpendicular configuration, further comprising hook and pile fastener material secured to said exterior facing side of said second loop forming strap and companionate hook and pile fastener material secured to said interior facing side of said second loop forming strap.

2. The tie-down assembly accessory of claim 1 wherein said first securing/slide loop forming strap section and said second securing/slide loop forming strap section extend from opposite side edges of the main strap section.

* * * * *